(12) United States Patent
Jung et al.

(10) Patent No.: US 8,482,706 B2
(45) Date of Patent: Jul. 9, 2013

(54) LIQUID CRYSTAL DISPLAY AND CONTROL METHOD THEREOF

(75) Inventors: Jun-ho Jung, Seoul (KR); Yung-jun Park, Yongin-si (KR); Jun-ho Sung, Seoul (KR); Tae-hyeun Ha, Suwon-si (KR); Jung-jin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/601,361

(22) Filed: Aug. 31, 2012

(65) Prior Publication Data

US 2012/0327317 A1    Dec. 27, 2012

Related U.S. Application Data

(62) Division of application No. 12/133,381, filed on Jun. 5, 2008, now Pat. No. 8,355,097.

(30) Foreign Application Priority Data

Jun. 5, 2007 (KR) .................. 10-2007-0055135
Nov. 27, 2007 (KR) .................. 10-2007-0121715

(51) Int. Cl.
*G02F 1/1335* (2006.01)
(52) U.S. Cl.
USPC ........................................... 349/117
(58) Field of Classification Search
USPC ........................................... 349/9
See application file for complete search history.

(56) References Cited

U.S. PATENT DOCUMENTS

| 6,456,432 | B1 | 9/2002 | Lazzaro et al. |
| 7,690,805 | B2 | 4/2010 | Kubota et al. |
| 2007/0109240 | A1 | 5/2007 | Jung |
| 2008/0170178 | A1 | 7/2008 | Kubota et al. |

FOREIGN PATENT DOCUMENTS

| KR | 10-2006-0007662 A | 1/2006 |
| KR | 10-2007-0009711 A | 1/2007 |

OTHER PUBLICATIONS

Restriction Requirement, mailed Jun. 9, 2011, issued in parent U.S. Appl. No. 12/133,381.
Non-Final Office Action, mailed Oct. 21, 2011, issued in parent U.S. Appl. No. 12/133,381.
Final Office Action, mailed Apr. 5, 2012, issued in parent U.S. Appl. No. 12/133,381.
Ex Parte Quayle Action, mailed Jun. 29, 2012, issued in parent U.S. Appl. No. 12/133,381.
Communication dated May 24, 2013 issued by the Korean Intellectual Property Office in counterpart Korean Patent Application No. 10-2007-0121715.

*Primary Examiner* — Phu Vu
(74) *Attorney, Agent, or Firm* — Sughrue Mion, PLLC

(57) ABSTRACT

A liquid crystal display includes: a pair of liquid crystal shutter glasses; a liquid crystal panel which alternately displays a left image and a right image formed in a predetermined scanning direction according to a predetermined scanning cycle; a glasses controller which outputs a control signal to open and close a left glass and a right glass of the liquid crystal shutter glasses synchronizing with the scanning cycle; a light source unit which supplies light to the liquid crystal panel; and a light source driver which supplies driving power to the light source unit to emit light to the liquid crystal panel in the scanning direction posterior to the left and right images.

13 Claims, 12 Drawing Sheets

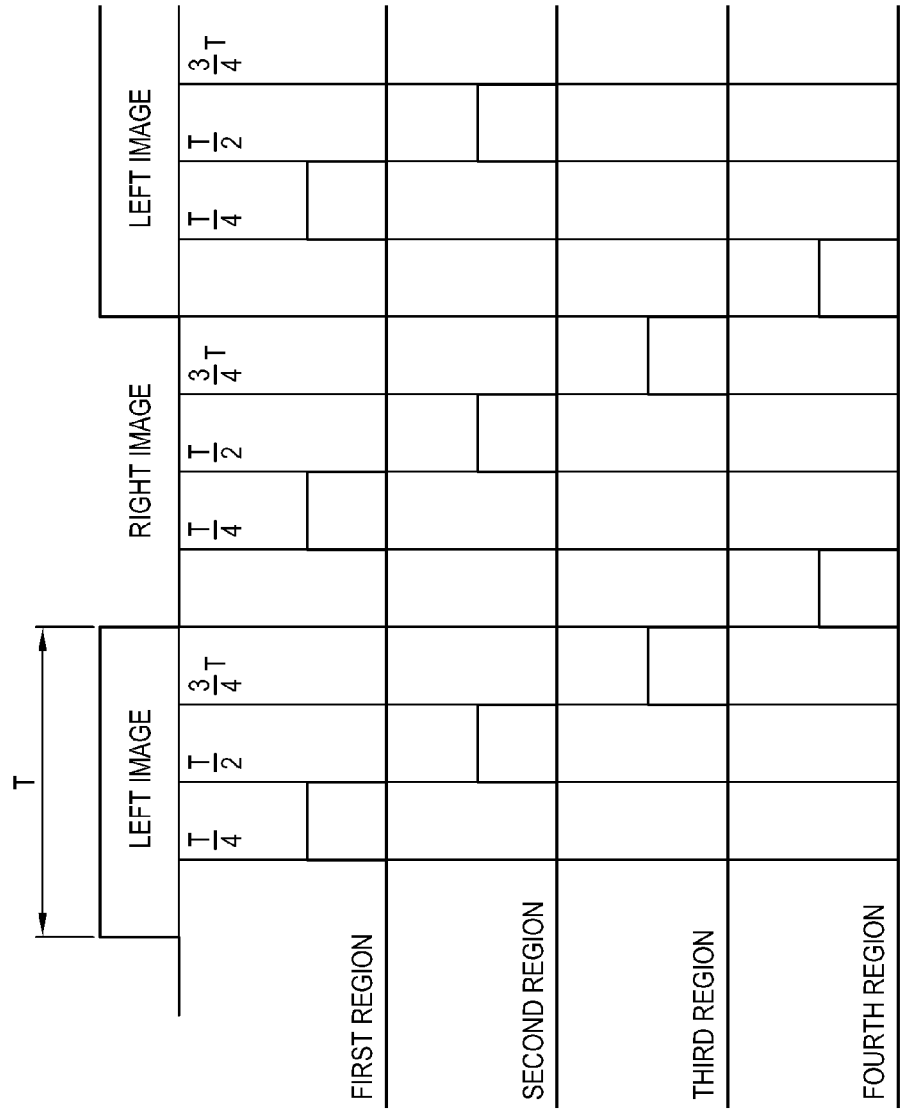

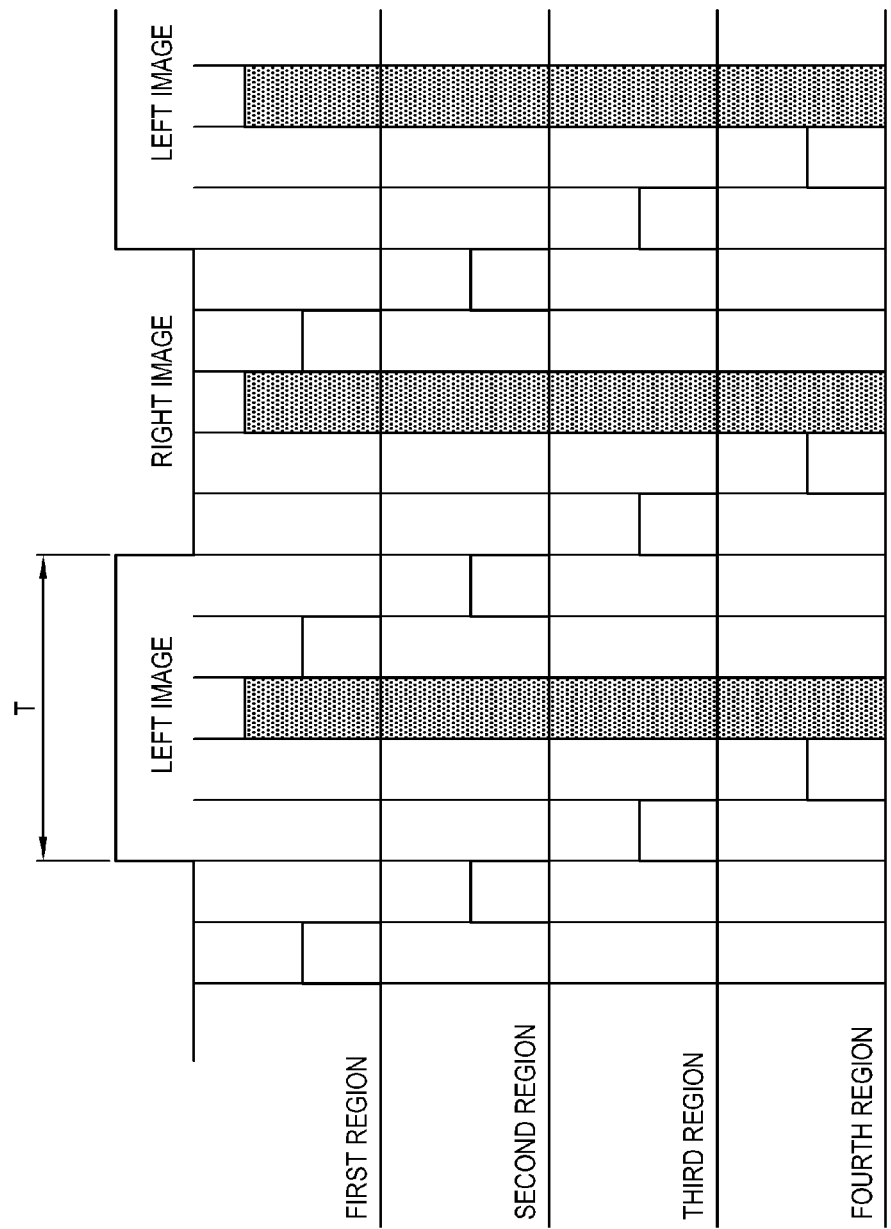

LIQUID CRYSTAL DISPLAY AND CONTROL METHOD THEREOF

CROSS-REFERENCE TO RELATED APPLICATIONS

This application is a divisional of U.S. application Ser. No. 12/133,381, filed Jun. 5, 2008, which claims priorities from Korean Patent Applications No. 10-2007-0055135, filed on Jun. 5, 2007 and No. 10-2007-0121715, filed on Nov. 27, 2007, in the Korean Intellectual Property Office, the disclosures of which are incorporated herein by reference in their entirety.

BACKGROUND OF THE INVENTION

1. Field of the Invention

Apparatuses and methods consistent with the present invention relate to a liquid crystal display and a control method thereof, and more particularly, to a liquid crystal display which includes a pair of liquid crystal shutter glasses, and a control method thereof.

2. Description of the Related Art

Recently, a three-dimensional display apparatus has been developed as a next generation display apparatus. The three-dimensional display apparatus alternately displays a left image and a right image by using a visual difference between both eyes, or simultaneously displays left and right images optically.

A contact type which is mainly used to simultaneously display the left and right images overlaps a viewing zone forming optical plate to a front surface of a display panel.

If the left and right images are alternately formed, left and right images are rapidly displayed and liquid shutter glasses for each eye are open and closed synchronizing with the images to realize a three-dimensional image.

If a display panel includes a liquid crystal panel, left and right images overlap each other as the liquid crystal panel should maintain a voltage in a single frame. Unlike a CRT (cathode ray tube) or other display panels, the liquid crystal panel is a hold-type display panel. Thus, a previous image signal remains on the liquid crystal panel before completely forming a current image signal thereon after displaying the previous image. A user recognizes such a phenomenon as an image overlapping and a latent image. Thus, a conventional liquid crystal display fails to provide a high quality three-dimensional image.

SUMMARY OF THE INVENTION

Accordingly, it is an aspect of the present invention to provide a liquid crystal display which improves an image overlapping and a latent image, and a control method thereof.

Additional aspects of the present invention will be set forth in part in the description which follows and, in part, will be obvious from the description, or may be learned by practice of the present invention.

The foregoing and/or other aspects of the present invention are also achieved by providing a liquid crystal display, comprising a pair of liquid crystal shutter glasses; a liquid crystal panel which alternately displays a left image and a right image formed in a predetermined scanning direction according to a predetermined scanning cycle; a glasses controller which outputs a control signal to open and close a left glass and a right glass of the liquid crystal shutter glasses synchronizing with the scanning cycle; a light source unit which supplies light to the liquid crystal panel; and a light source driver which supplies driving power to the light source unit to emit light to the liquid crystal panel; wherein a blank period, in which no light is provided to the liquid crystal panel, is inserted in displaying the left image and the right image.

Other aspects of the present invention are achieved by providing a control method in a display apparatus having a backlight unit divided into a plurality of portions, the method comprising the steps of receiving an input video signal having a plurality of neighboring frames or fields with respect to time; scanning a predetermined image portion of one of the neighboring frames or fields on a predetermined portion of a display panel of the display apparatus; scanning in a sequentially manner remaining image portions of one of the neighboring frames or fields on remaining portions of the display panel; and providing light to the predetermined portion of the display panel after the scanning of another portion of the display panel begins.

Other aspects of the present invention are achieved by providing a liquid crystal display, comprising: a pair of liquid crystal shutter glasses; a liquid crystal panel which alternately displays a left image and a right image formed in a predetermined scanning direction according to a predetermined scanning cycle; a glasses controller which outputs a control signal to open and close a left glass and a right glass of the liquid crystal shutter glasses synchronizing with the scanning cycle; a light source unit which supplies light to the liquid crystal panel; and a light source driver which supplies driving power to the light source unit to emit light to the liquid crystal panel in the scanning direction posterior to the left and right images.

The light source unit may comprise a plurality of regions which is divided in a direction substantially perpendicular to the scanning direction, and the light source driver sequentially and individually supplies the driving power to the regions synchronizing with the scanning cycle.

The light source driver may cut off the driving power supplied to the light source unit not to emit light to the liquid crystal panel during a predetermined blank period.

The blank period may be formed between a left image frame and right image frame.

The blank period may be formed while a single frame is formed.

The light source unit may further comprise a wall which is formed between the regions.

The liquid crystal display may further comprise a light adjusting member which is disposed between the liquid crystal panel and the light source unit, and adjusts a diffusion of light emitted by the light source unit.

The liquid crystal panel may display 120 frames per second.

The foregoing and/or other aspects of the present invention are also achieved by providing a control method of a liquid crystal display which has a liquid crystal panel alternately displaying a left image signal and a right image signal according to a predetermined scanning cycle and a pair of liquid crystal shutter glasses opening and closing a left glass and a right glass thereof, the control method comprising: opening and closing the left glass and the right glass of the liquid crystal shutter glasses synchronizing with the scanning cycle while an image signal is displayed on the liquid crystal panel in a predetermined scanning direction; and supplying light to the liquid crystal panel in the scanning direction posterior to the image signal.

The liquid crystal panel may be divided into predetermined image regions, and the supplying the light comprises supplying the light to the image regions sequentially and individually.

The control method may further comprise shutting down light emitted to the liquid crystal panel during a predetermined blank period.

The liquid crystal panel may display 120 frames per second.

BRIEF DESCRIPTION OF THE DRAWINGS

The above and/or other aspects of the present invention will become apparent and more readily appreciated from the following description of the embodiments, taken in conjunction with the accompanying drawings of which:

FIG. 4 illustrates a timing of the light source unit according to the first exemplary embodiment of the present invention;

FIG. 7 illustrates a timing of a light source unit according to a third exemplary embodiment of the present invention.

DETAILED DESCRIPTION OF EXEMPLARY EMBODIMENT

Hereinafter, exemplary embodiments of the present invention will be described with reference to accompanying drawings, wherein like numerals refer to like elements and repetitive descriptions will be avoided as necessary.

Figure 1:
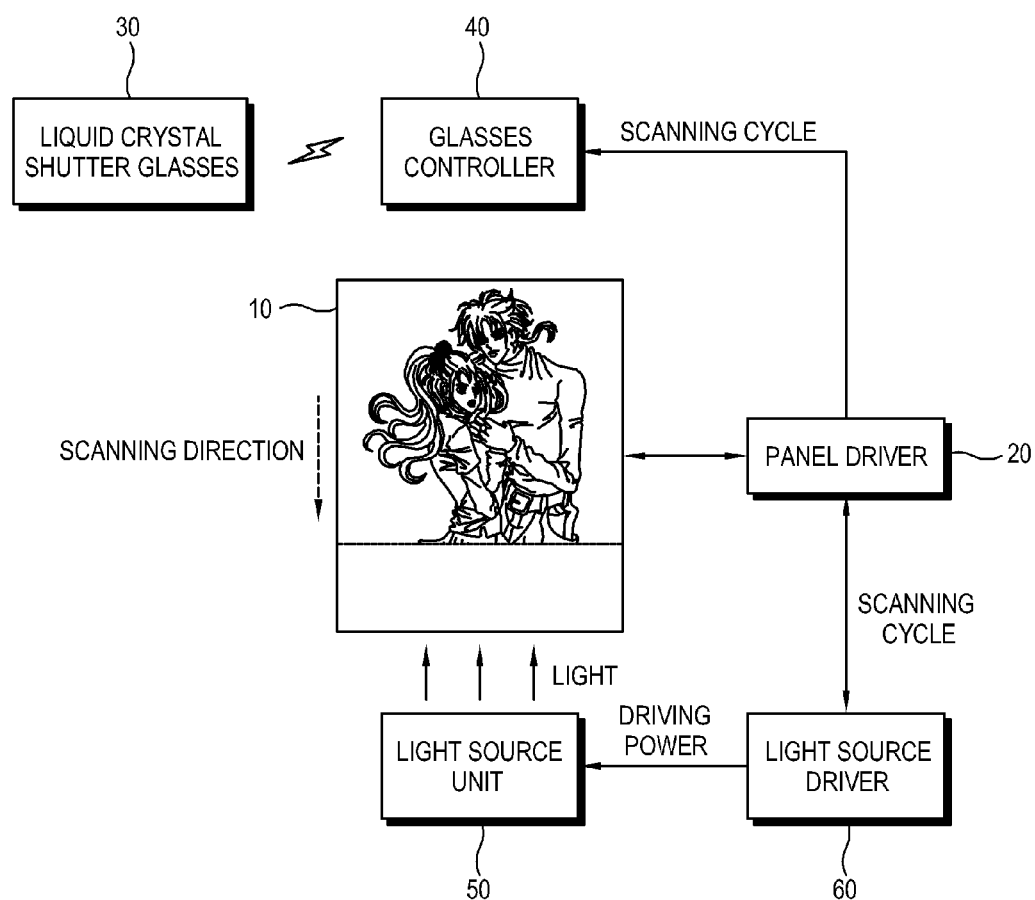
FIG. 1 is a control block diagram of a liquid crystal display according to a first exemplary embodiment of the present invention.
Figure 2:
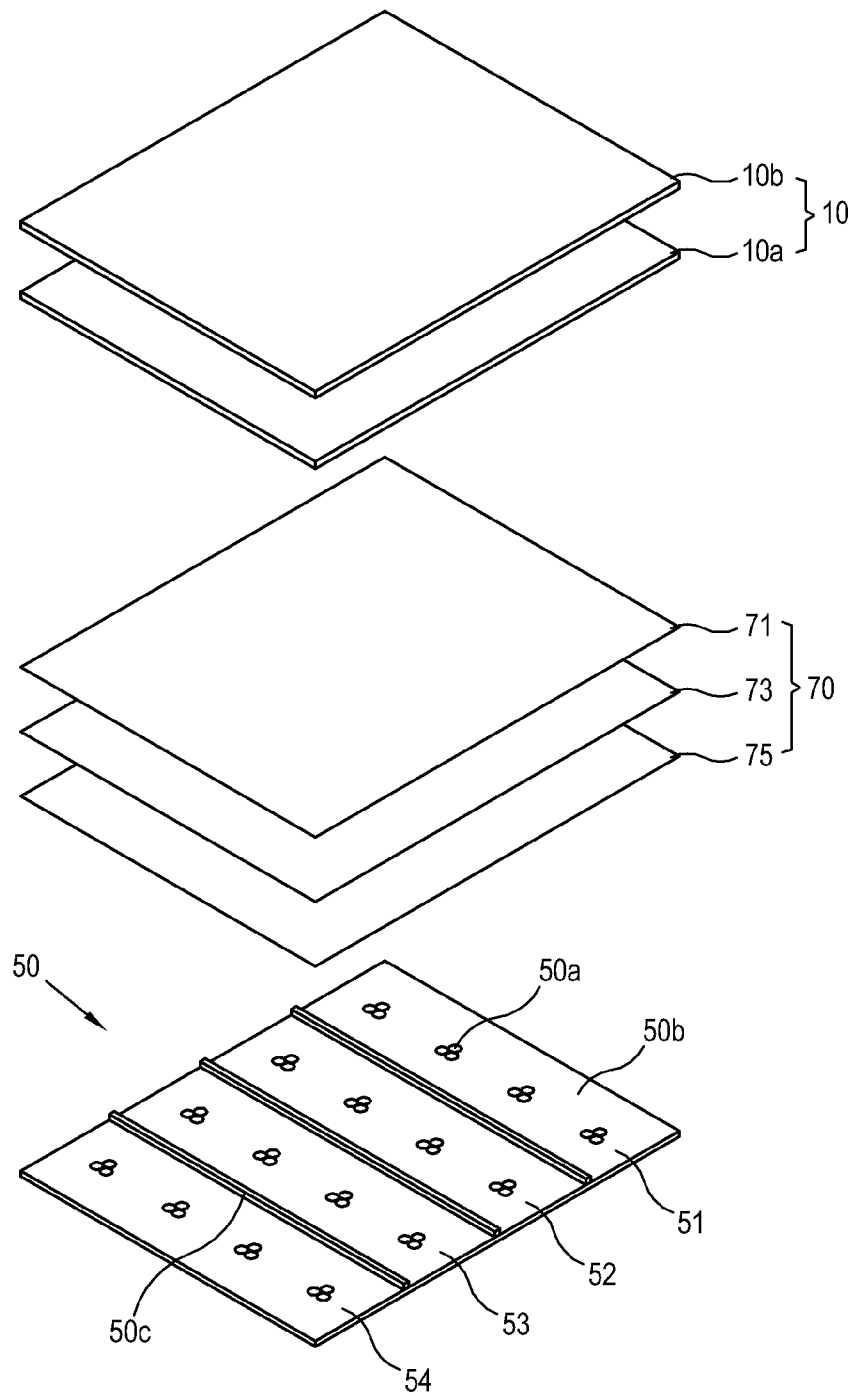
FIG. 2 is a schematic perspective view of the liquid crystal display according to the first exemplary embodiment of the present invention.

FIG. 1 is a control block diagram of a liquid crystal display according to a first exemplary embodiment of the present invention. FIG. 2 is a schematic perspective view of the liquid crystal display according to the present embodiment. As shown therein, the liquid crystal display according to the present embodiment includes a liquid crystal panel 10, a panel driver 20, a pair of liquid crystal shutter glasses 30, a glasses controller 40, a light source unit 50 and a light source driver 60. The liquid crystal display further includes a light adjusting member 70 which is disposed between the liquid crystal panel 10 and the light source unit 50.

The liquid crystal panel 10 includes a first substrate 10a having a thin film transistor, a second substrate 10b facing the first substrate 10a and a liquid crystal layer (not shown) formed between the first substrate 10a and second substrate 10b. The liquid crystal panel 10 includes a plurality of pixels having the thin film transistor. A gate line and a data line are formed in the liquid crystal panel 10 to drive the pixels. The liquid crystal panel 10 is typically rectangular. An image is formed on the liquid crystal panel 10 in a scanning direction corresponding to a shorter side of the liquid crystal panel 10. That is, the image is sequentially displayed on the liquid crystal panel 10 in the scanning direction and a single frame is formed by scanning the rows of pixels, beginning with a first row and ending with a last row, in the liquid crystal panel 10.

The liquid crystal panel 10 alternately displays left image and right image per frame according to a control of the panel driver 20. The left image and right image are displayed on the liquid crystal panel 10 at an equivalent scanning cycle T. According to the present embodiment, an image signal which is inputted at 60 Hz is divided into left and right images to be displayed. Thus, 120 frames per second are formed on the liquid crystal panel 10. That is, the scanning cycle T of the image displayed on the liquid crystal panel 10 is $\frac{1}{120}$ second. Even though 120 frames per second are formed on the liquid crystal panel 10, a user recognizes that 60 frames are formed for the left image and right image combined. If an image inputted at 60 Hz is divided into left image and right image to be outputted and if 60 frames per second are formed, a user recognizes that 30 frames per second are displayed. If the frame frequency is reduced, a user may recognize a change in the frames. As continuity of the frames decreases, image quality is lowered.

According to another exemplary embodiment, an interpolation frame may be formed to interpolate inputted image signals. As an example, 180 or 240 frames per second may be formed on the liquid crystal panel 10.

The panel driver 20 receives an image signal from the outside and converts the image signal properly to display left image and right image. The panel driver 20 applies the converted image signal to the liquid crystal panel 10. The panel driver 20 includes a gate driver applying a gate signal to the gate line and a data driver applying a data signal to the data line, respectively, and a timing controller controlling the gate driver and the data driver, to thereby drive and control the liquid crystal panel 10. The panel driver 20 outputs information about the scanning cycle T, to the glasses controller 40 and the light source driver 60.

The glasses controller 40 outputs a control signal to the liquid crystal shutter glasses 30 to open and close a left glass and a right glass of the liquid crystal shutter glasses 30 synchronizing with the scanning cycle T of the image. The glasses controller 40 may include an infrared light emitting device to emit infrared rays to the liquid crystal shutter glasses 30. In this case, the infrared rays correspond to the control signal. Other types of control signals can be used such as RF signal and Bluetooth.

The liquid crystal shutter glasses 30 alternately open and close the left glass and the right glass according to the control signal inputted by the glasses controller 40 so that a user views the left and right images alternately. The liquid crystal shutter glasses 30 include a receiver to detect and receive the control signal, and a liquid crystal part to block and receive a left-eye image or a right-eye image according to the received control signal. The left glass and right glass of the liquid crystal shutter glasses alternately open and closed according to the scanning cycle T. Thus, a user may view a three-dimensional image by recognizing the left and right images alternately with the liquid crystal shutter glasses 30 opening and closing.

The light source unit 50 is provided behind the liquid crystal panel 10 and supplies light to the liquid crystal panel 10. The light source unit 50 includes a plurality of light sources 50a, a light source circuit substrate 50b mounting the light sources 50a, and a wall 50c to divide the light source circuit substrate 50b.

The light source unit 50 may include a lamp as a line light source, or a light emitting diode or a nanotube light source as a point light source. The light source unit 50 may otherwise include a surface light source which has been widely developed. The light sources 50a according to the present embodiment include a light emitting diode which is uniformly formed across the rear side of the liquid crystal panel 10. The light source unit 50 according to the present embodiment is divided into a plurality of regions 51, 52, 53 and 54 (refer to FIG. 3A) in a direction substantially perpendicular to the scanning direction, i.e. in a longer-side direction of the liquid crystal panel 10. The regions 51 to 54 receive driving power from the light source driver 60. The light sources 50a which are included in each of the regions 51 to 54 emit light simultaneously. The regions 51 to 54 are sequentially driven in the scanning direction.

Like the liquid crystal panel 10, the light source circuit substrate 50b is shaped like a rectangle. The light source driver 60 which will be described later may be provided behind the light source circuit substrate 50b. As the LED generates much heat, the light source circuit substrate 50b may include aluminum having good heat conductivity. The liquid crystal display may further include a heat pipe, a heat-dissipating fin and a cooling fan (which are not shown) to dissipate heat without difficulty.

The wall 50c divides the liquid crystal panel 10 into the regions 51 to 54 and prevents interference of light emitted by the regions 51 to 54. If the independence of the light emitted by the respective regions 51 to 54 is maintained, efficiency of a scanning-driving (to be described later) improves. Also, the image overlapping is reduced.

The light source driver 60 supplies driving power to the light source unit 50, and sequentially supplies driving power to the regions 51 to 54 synchronizing with the scanning cycle T. That is, a single region emits light at a time while remaining regions 51 to 54 are not driven. If a part of the light source unit 50 emits light and the light emitting part is scanned, the latent image and the image overlapping of the liquid crystal panel 10 improve. That is, the hold-type liquid crystal panel 10 has a black condition not to receive light, thereby realizing an impulsive type such as a CRT. The image is not displayed on a part of the liquid crystal panel 10 not receiving light. Thus, the image overlapping improves and the light is controlled not to be diffused to unnecessary regions of the liquid crystal panel 10.

Figure 3A:
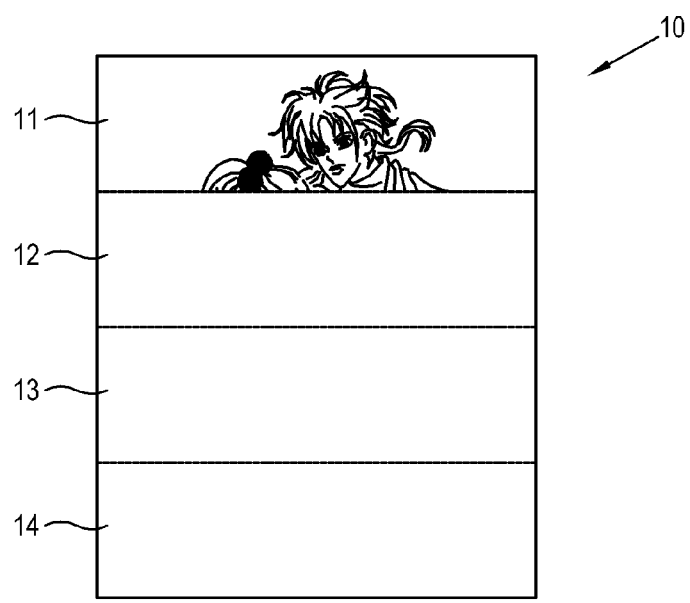
FIGS. 3A to 3F illustrate a scanning method of a liquid crystal panel and a light source unit according to the first exemplary embodiment of the present invention.
Figure 3B:
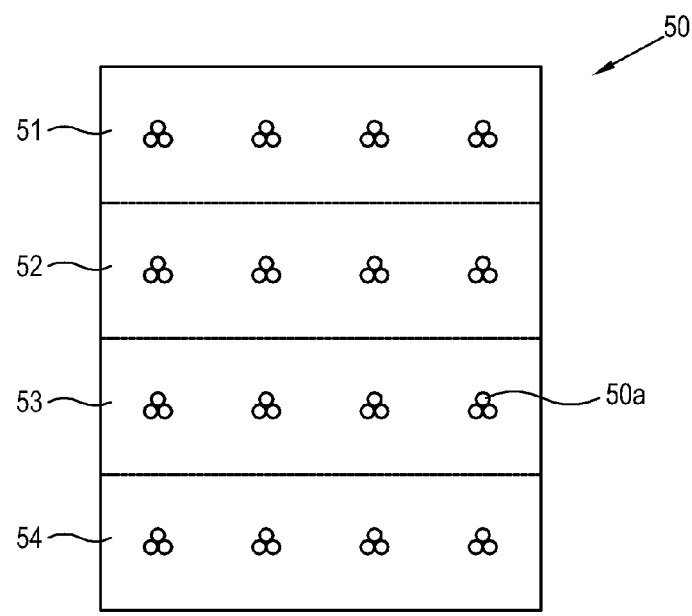
Figure 3C:
Figure 3D:
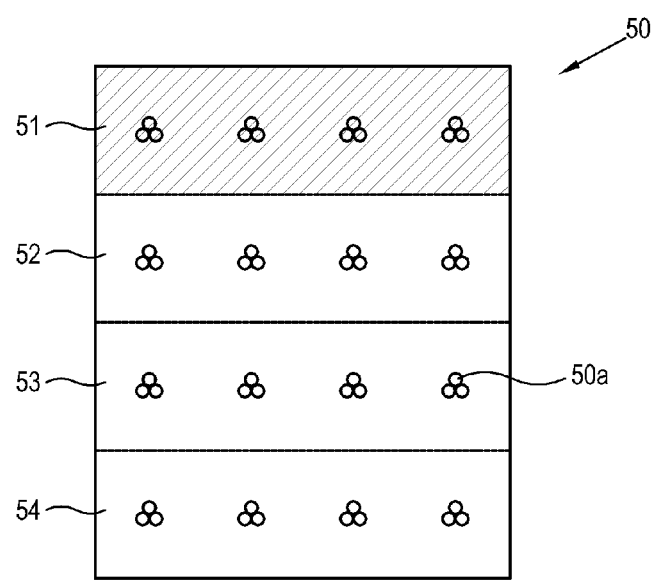
Figure 3E:
Figure 3F:
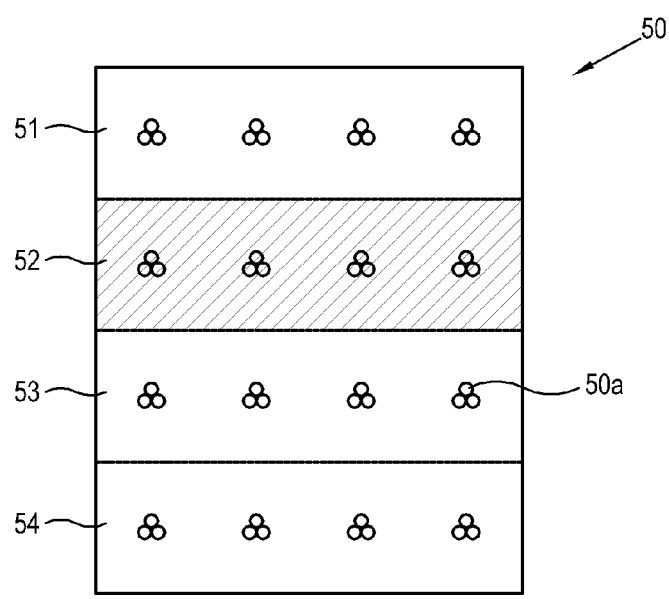

FIGS. 3A to 3F illustrate a scanning method of the liquid crystal panel 10 and the light source unit 50 according to the present embodiment. FIG. 4 illustrates a timing to describe a light emitting pattern of the light source unit 50. The method of supplying driving power to the light source unit 50 will be described with reference to FIGS. 3A to 4. FIGS. 3A, 3C and 3E illustrate a process of scanning an image on the liquid crystal panel 10. FIGS. 3B, 3D and 3F illustrate a process of scanning the regions 51 to 54 of the light source unit 50 corresponding to the scanned image. The light source unit 50 is divided into first to fourth regions 51 to 54 and includes the plurality of point light sources 50a.

As shown in FIG. 3A, while the image is scanned to a first image region 11 corresponding to a quarter of the liquid crystal panel 10, any of the regions 51 to 54 of the light source unit 50 is not driven as shown in FIG. 3B. As shown in FIG. 3C, if the image is scanned to a second image region 12 corresponding to half of the liquid crystal panel 10, the first region 51 is driven as shown in FIG. 3D. The liquid crystal layer of the liquid crystal panel 10 maintains an image signal of the image corresponding to the first image region 11 until a single frame is completed. A user views the image when the first region 51 is driven. If the image is sequentially scanned to a third image region 13 as shown in FIG. 3E, the second region 52 is driven corresponding to the second image region 12 as shown in FIG. 3F.

Referring to FIG. 4, the left and right images are alternately displayed on the liquid crystal panel 10 according to the scanning cycle T. Each of the regions 51 to 54 is sequentially driven for T/4. If the image is scanned initially, the regions 51 to 54 are not driven as shown in FIG. 3B. Thus, light is not supplied to the liquid crystal panel 10 for the first T/4. If the second to fourth image regions are sequentially scanned, the first to third regions 51 to 53 are sequentially scanned according to the scanned image regions.

If the scanning cycle T of the left image is finished and if the first image region of the right image is scanned, the fourth region 54 is driven.

That is, the light source driver 60 supplies driving power to the light source unit 50 to scan light posterior to the image displayed on the liquid crystal panel 10. Thus, the image overlapping which occurs in the conventional liquid crystal display apparatus due to the remaining left image while the right image is scanned, does not occur. As the light from the light source unit 50 is scanned posterior to the image and the image is displayed partially, the left and right images are not viewed simultaneously.

The light adjusting member 70 is disposed between the liquid crystal panel 10 and the light source unit 50, and includes a protection film 71, a prism film 72 and a diffusion adjusting plate 73.

The protection film 71 is provided on a top of the light adjusting member 70 and protects the prism film 72 against scratches.

The prism film 72 has triangular prisms arranged on an upper surface thereof in a consistent pattern. The prism film 72 collects light passing through the diffusion adjusting plate 73 in a direction perpendicular to a surface of the liquid crystal panel 10. The prism film 72 typically includes two sheets of films. Micro prisms which are formed on the respective prism films 72 have a predetermined angle. Light passes through the prism films 72, and progresses almost vertically to provide uniform brightness distribution. A reflective polarizer film may be used together with the prism films 72. Otherwise, only the reflective polarizer film may be used.

The diffusion adjusting plate 73 includes a base layer and a coating layer which has beads formed on the base layer. The diffusion adjusting plate 73 adjusts diffusion of light supplied by the light sources 50a. According to the present embodiment, the diffusion adjusting plate 73 reduces diffusion of the light. That is, the diffusion adjusting plate 73 prevents excessive diffusion of light so that light emitted by the particular regions 51 to 54 do not affect other regions 51 to 54. The diffusion adjusting plate 73 may be designed to diffuse light emitted by one of the regions 51 to 54 and make the brightness uniform.

Figure 5:
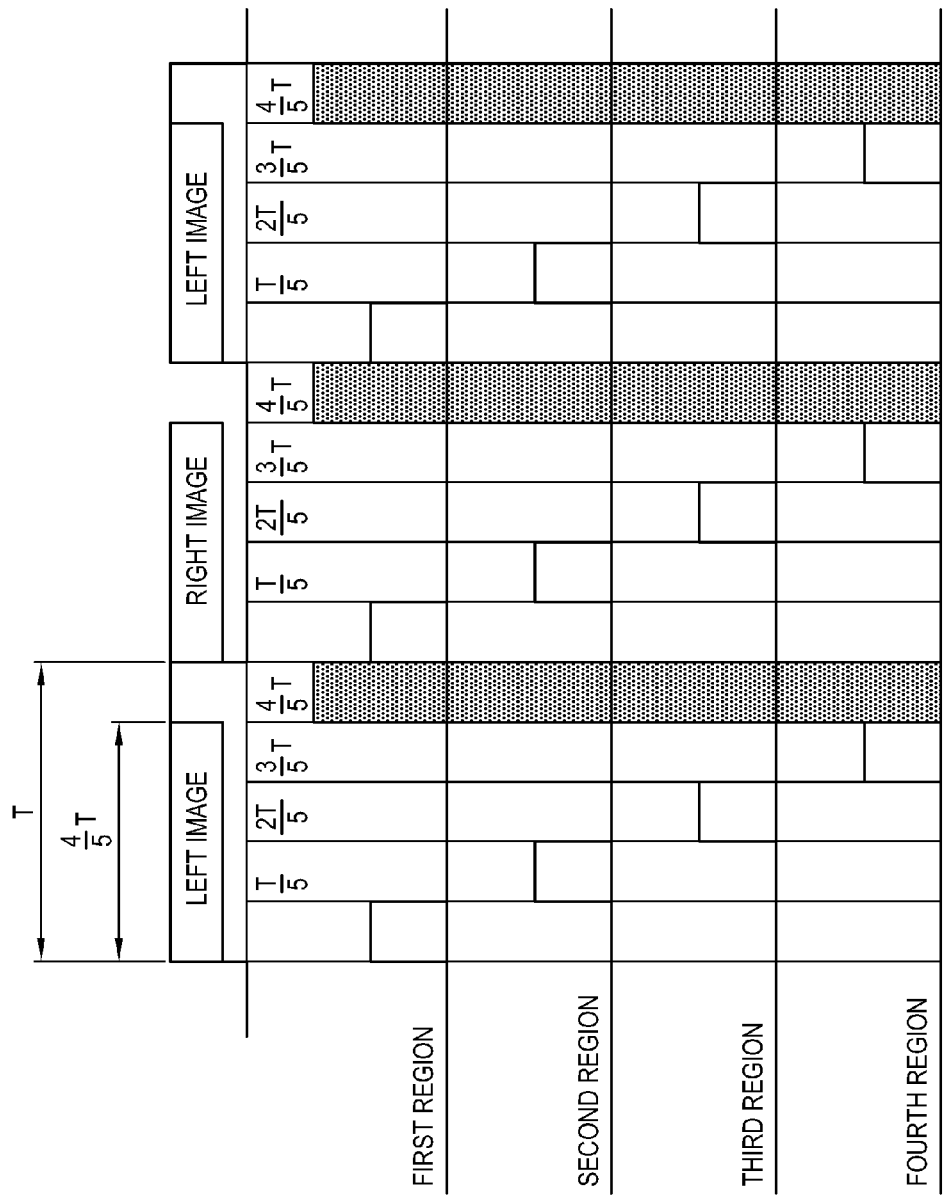
FIG. 5 illustrates a timing of a light source unit according to a second exemplary embodiment of the present invention.
Figure 6:
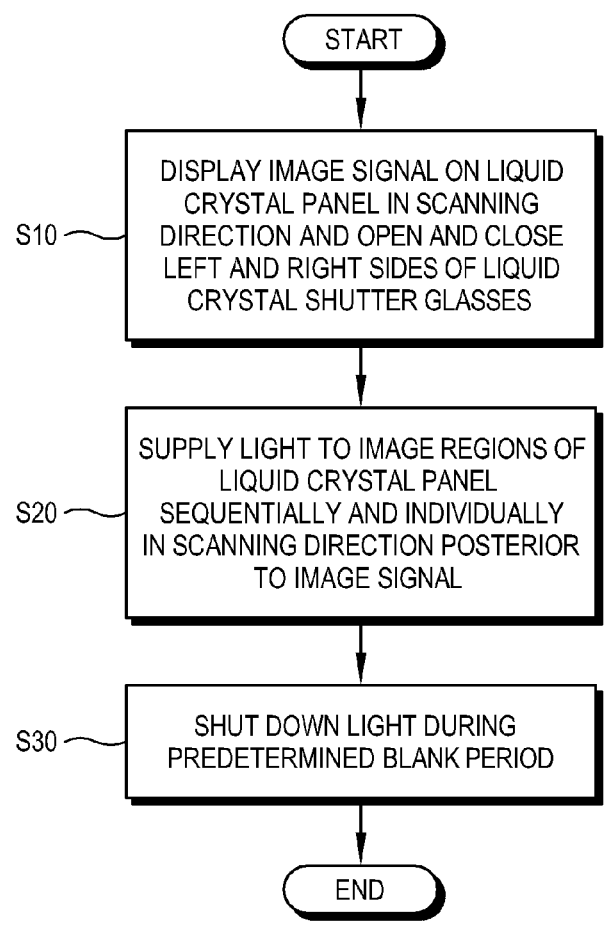
FIG. 6 is a control flowchart to describe a control method of a liquid crystal display according to the second exemplary embodiment of the present invention.

FIG. 5 illustrates a timing to describe a light emitting pattern of a light source unit 50 according to a second exemplary embodiment of the present invention. FIG. 6 is a control flowchart to describe a control method of the liquid crystal display according to the present embodiment.

As shown therein, the light source unit 50 according to the present embodiment does not emit light to a liquid crystal panel 10 between frames of displaying the left image and right image. The left image and right image are scanned to the liquid crystal panel 10 for 4T/5, which is shorter than the scanning cycle T for forming a single frame. The liquid crystal panel 10 maintains the formed image for the remaining T/5. The regions 51 to 54 are sequentially driven for each T/5 synchronizing with the scanned image, and are not driven for the last T/5.

That is, the liquid crystal display according to the present embodiment has a blank period B in which an image is not displayed on the liquid crystal panel 10 after a single frame is formed and before a consecutive frame is formed. The blank period B is realized by the light source unit 50. The light source driver 60 does not supply driving power to the light source unit 50 during the blank period B. The blank period B prevents the latent image in the liquid crystal panel 10. Also, the problems due to the light diffused to the unnecessary regions may be reduced.

According to the present embodiment, light is supplied to the regions 51 to 54 corresponding to the scanned image. Alternatively, the light may be supplied posterior to the scanned image as described above. The blank period B may be formed at an initial stage of forming a single frame instead of being formed after the image is completed. The timing of forming the blank period B, the time of maintaining the blank period B and the scanning method of the regions 51 to 54 may be determined by the one ordinarily skilled in the art.

The control method of the liquid crystal display according to the present embodiment will be described with reference to FIG. 6. First, left image signal and right image signal are alternately displayed on the liquid crystal panel 10 according to the scanning cycle T in the scanning direction, and the left glass and right glass of the liquid crystal shutter glasses 40 are open and closed (S10).

The left glass and right glass of the liquid crystal shutter glasses 40 are open and closed corresponding to the scanning cycle T. If the left image signal is displayed, the left glass of the liquid crystal shutter glasses 40 is open. If the right image signal is displayed, the right glass of the liquid crystal shutter glasses 40 is open. The liquid crystal panel 10 may display 120 and above frames per second.

Light is sequentially supplied to the image regions 11 to 14 of the liquid crystal panel 10 in the scanning direction posterior to the image signal (S20). The light source unit 50 is divided into the regions 51 to 54 corresponding to the image regions 11 to 14. The driving power supplied to the regions 51 to 54 is controlled so that light supplied to the liquid crystal panel 10 is scanned.

The light source driver 60 shuts down light emitted to the liquid crystal panel 10 during the blank period B between the frames of the left image signal and the right image signal (S30). The latent image in the liquid crystal panel 10 is prevented by the blank period B during which light is not supplied to the liquid crystal panel 10. As stated above, the blank period B may not be necessary in some of the embodiments of the present invention.

FIG. 7 illustrates a timing of a liquid crystal display according to a third exemplary embodiment of the present invention. As shown therein, a light source driver 60 according to the present embodiment forms a blank period B while a frame is formed. A single frame image signal is displayed according to a scanning cycle T. And light is scanned to a liquid crystal panel 10 posterior to the image signal, and is shut down for predetermined time within the scanning cycle T. That is, the timing of forming the blank period B is not limited to particular time. Alternatively, at least two blank periods B may exist while a single frame is formed. The number of the regions 51 to 54 is not limited to four. Alternatively, the regions 51 to 54 may vary depending on the size of the liquid crystal panel 10, the scanning rate of the light source driver 60, contrast ratio and brightness.

The left and right images are an example of images consecutively neighboring each other and thus, the present invention may be applicable to various different types of 3D formats or 2D formats having neighboring frames or fields.

As described above, the present invention provides a liquid crystal display apparatus which improves an image overlapping and a latent image, and a control method thereof.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A control method of a liquid crystal display which has a liquid crystal panel alternately displaying a left image signal and a right image signal according to a predetermined scanning cycle and a pair of liquid crystal shutter glasses opening and closing a left glass and a right glass thereof, the control method comprising:
   displaying an image signal on the liquid crystal panel in a predetermined scanning direction;
   opening and closing the left glass and the right glass of the liquid crystal shutter glasses synchronizing with the scanning cycle while displaying the image signal; and
   supplying light to the liquid crystal panel in the scanning direction posterior to the image signal, and
   wherein the liquid crystal panel is divided into predetermined image regions which are disposed in a direction substantially perpendicular to the scanning direction; and
   the supplying the light comprises supplying the light to the image regions sequentially and individually.

2. The control method according to claim 1, further comprising shutting down light emitted to the liquid crystal panel during a predetermined blank period.

3. The control method according to claim 1, wherein the liquid crystal panel displays 120 frames per second.

4. A control method in a display apparatus having a backlight unit divided into a plurality of portions, the method comprising:
   receiving an input video signal having a plurality of neighboring frames or fields with respect to time;
   scanning a predetermined image portion of one of the neighboring frames or fields on a predetermined portion of a display panel of the display apparatus;
   scanning in a sequentially manner remaining image portions of one of the neighboring frames or fields on remaining portions of the display panel; and
   providing light to the predetermined portion of the display panel after the scanning of the remaining image portion of the display panel begins.

5. The control method according to claim 4, wherein the display apparatus is a liquid crystal display.

6. The control method according to claim 4, wherein the display apparatus is a 3D display apparatus.

7. The control method according to claim 4, wherein the neighboring frames or fields correspond to left and right frames of a 3D input video signal.

8. The control method according to claim 7, wherein the left and the right frames are sequentially displayed to the user.

9. The control method according to claim 8, wherein the display apparatus is used in conjunction with an eye glass having left and right shutters operating in synchronization with the display of the left and right frames displayed to a viewer.

10. The control method according to claim 4, wherein a blank period is inserted between each of the neighboring frames or fields.

11. The control method according to claim 4, wherein the backlight unit is an LED type.

12. The control method according to claim 4, wherein a blank period is inserted within each of the neighboring frames or fields.

13. The control method according to claim 4, wherein the neighboring frames or fields are components of a 2D video.

* * * * *